Figure 6:
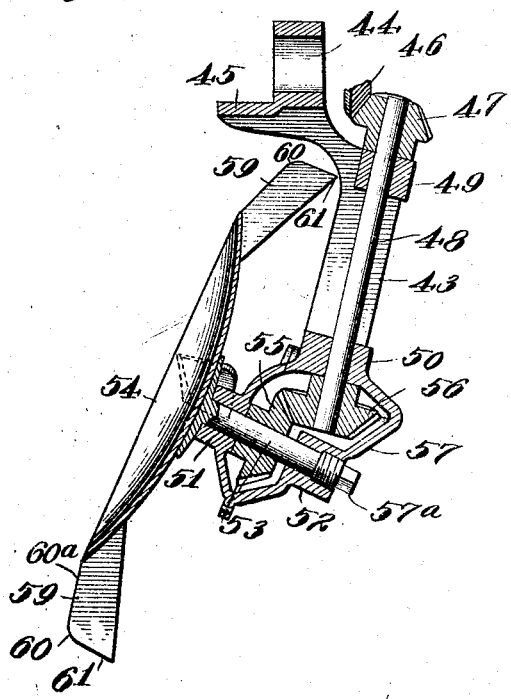

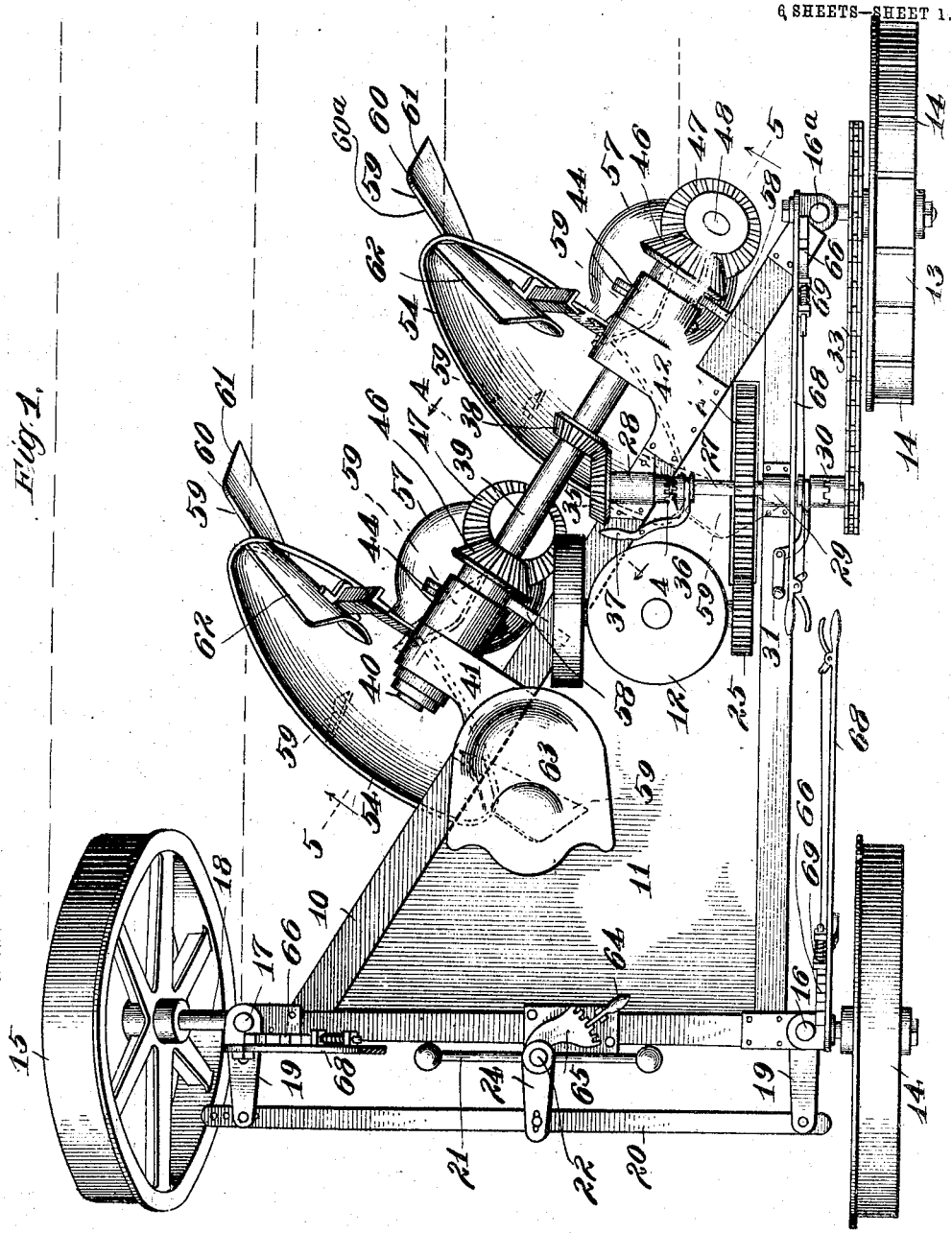

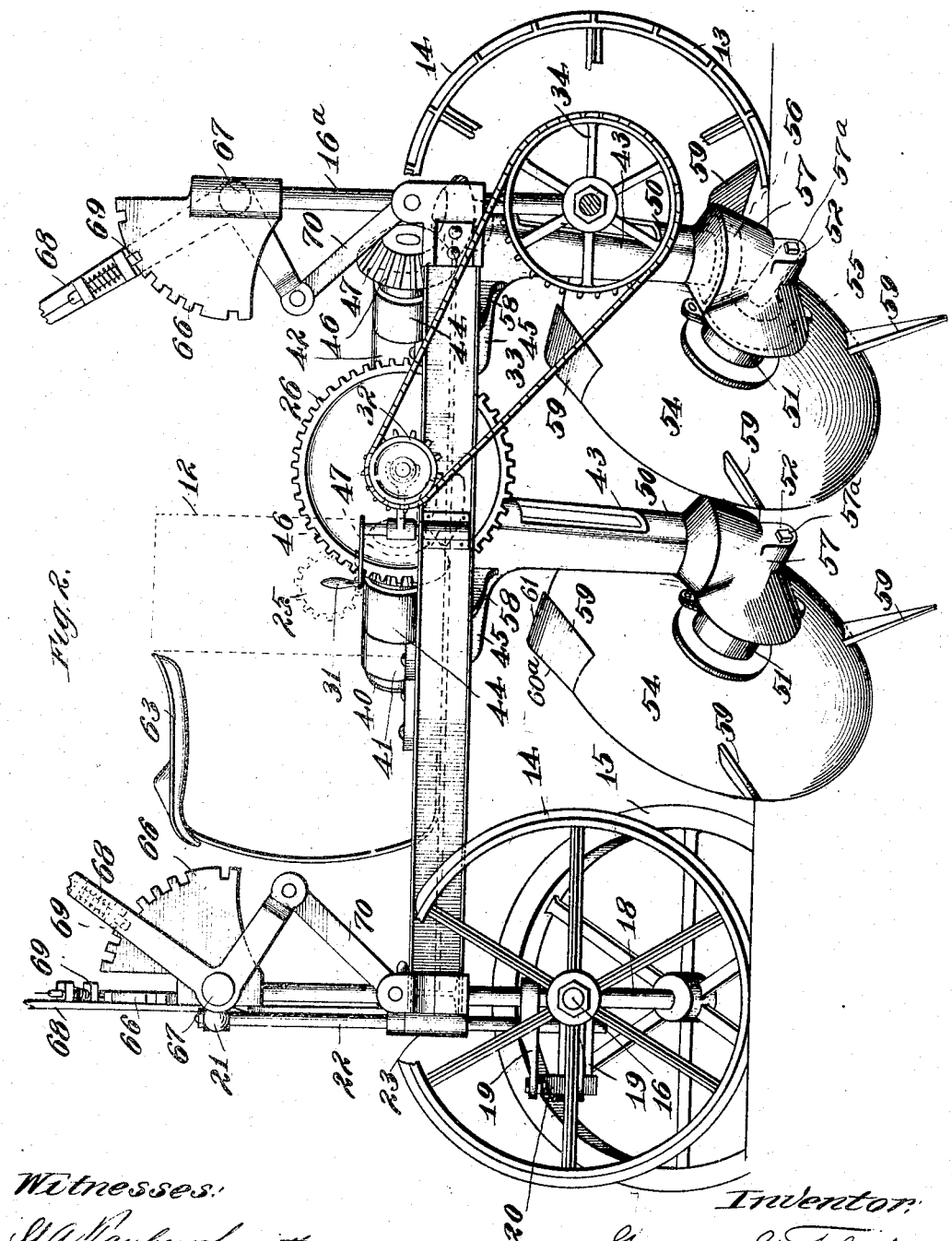

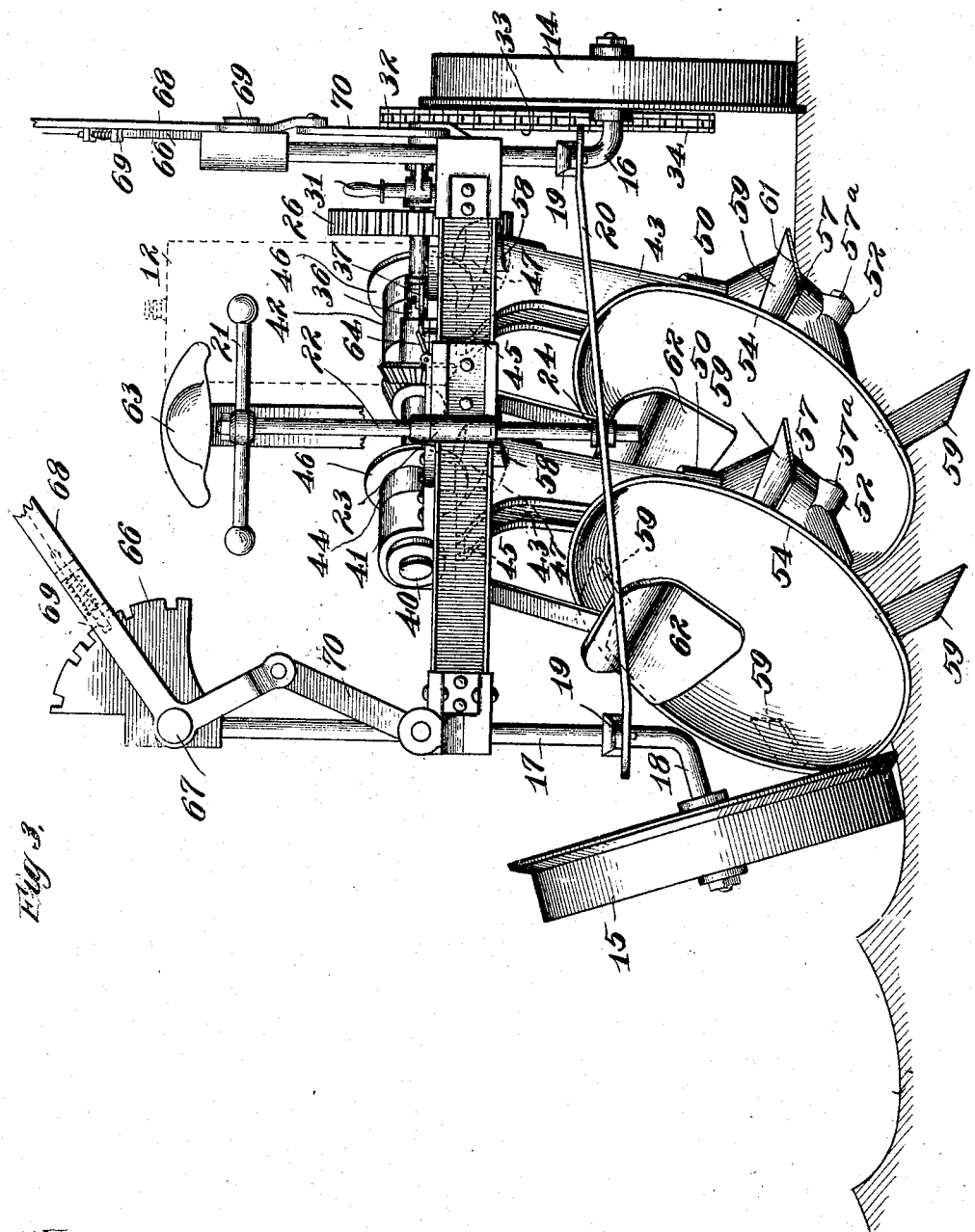

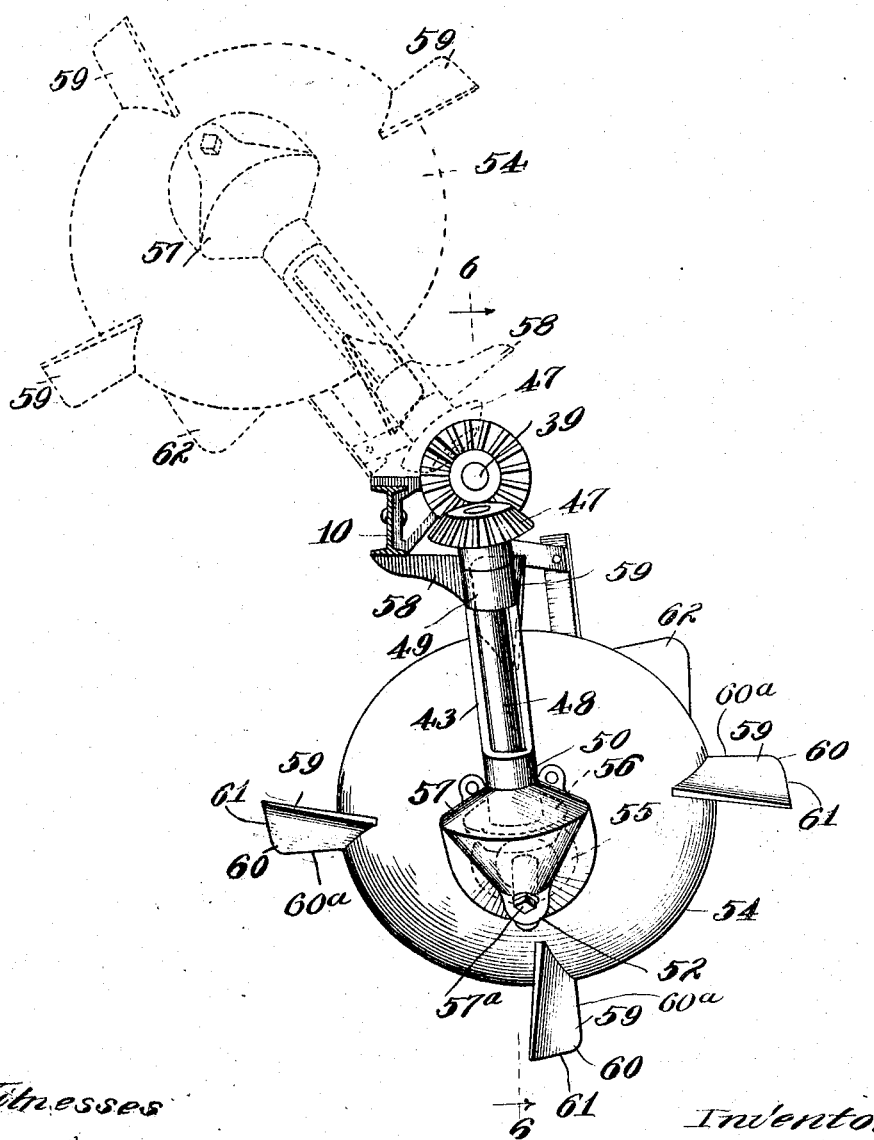

G. G. FLOYD.
PLOW.
APPLICATION FILED AUG. 28, 1907.

923,964.

Patented June 8, 1909.
6 SHEETS—SHEET 5.

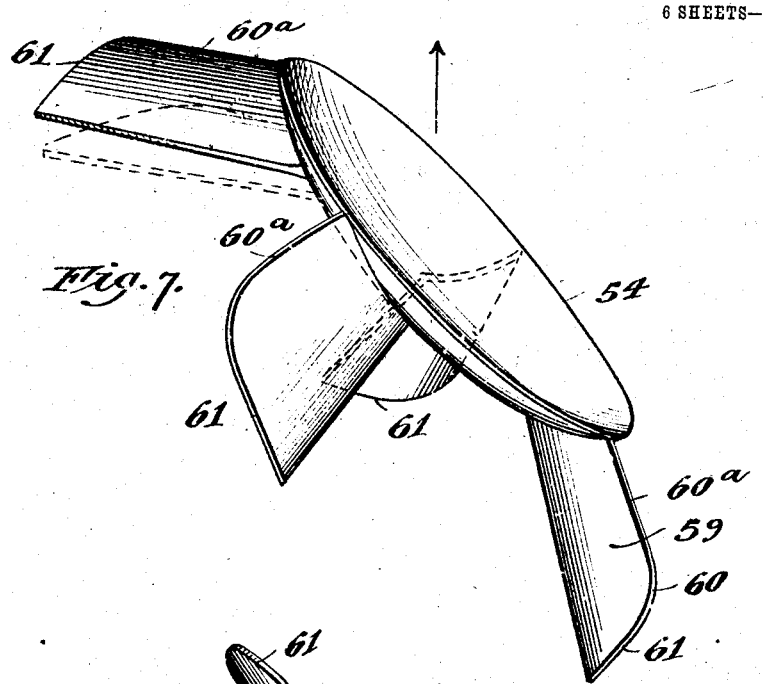
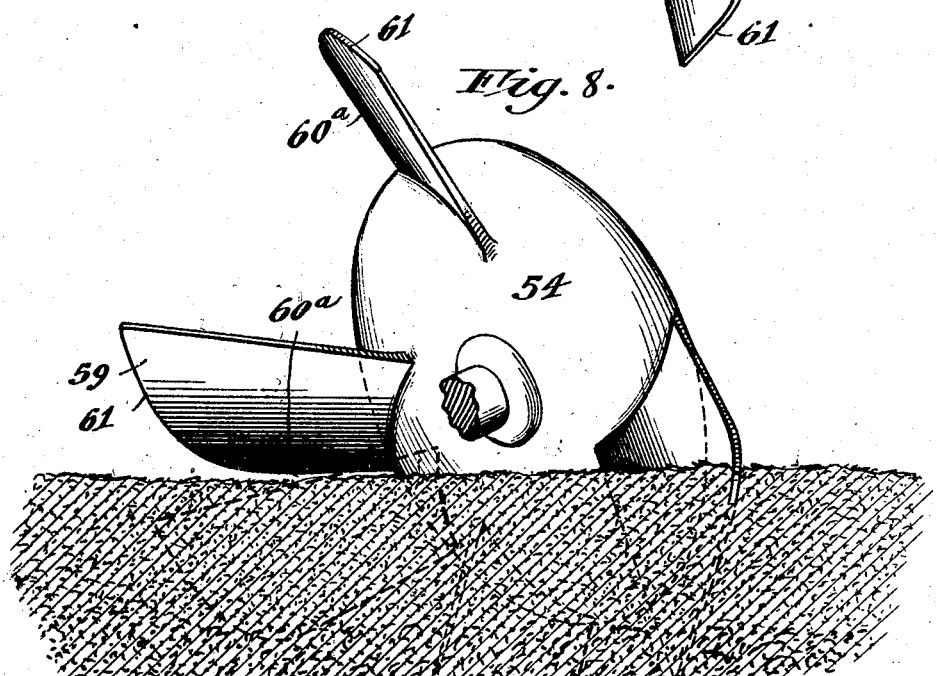

UNITED STATES PATENT OFFICE.

GEORGE G. FLOYD, OF GRANITE, ILLINOIS.

PLOW.

No. 923,964.  Specification of Letters Patent.  Patented June 8, 1909.

Application filed August 28, 1907. Serial No. 390,466.

*To all whom it may concern:*

Be it known that I, GEORGE G. FLOYD, a citizen of the United States, residing at Granite, in the county of Madison and State of Illinois, have invented certain new and useful Improvements in Plows, of which the following is a specification.

My invention relates to power-driven plows and comprises the provision of means for securing a firm hold in the ground to enable the plow to be propelled by its motor, which means also act at the same time to stir or loosen up the sub-soil.

My improved plow is of the rotary disk type, and preferably each disk has integral therewith, or at least fixed thereto so as to rotate therewith, a number of outstanding vanes or blades, the outer ends of which are farther from the axis of the disk than is the circular edge of the disk. A suitable motor, such as a gasolene or similar engine, is mounted on the frame of the machine and rotates these vaned or bladed concave plow disks. The disks and their scrapers or mold boards perform their usual function of cutting the furrows and turning over the earth, while it is due to their vanes or blades that sufficient purchase is obtained in the ground to enable the engine to propel the machine. As stated above, these blades or vanes also loosen up the sub-soil. The disks are disposed at an oblique angle to the direction of travel of the plow, and are also tipped or inclined. The wings or vanes are so placed on the rear sides of the disks that they enter the ground at substantially right angles to the direction of travel of the machine, enabling the securing of a firm hold in the ground, and leave the earth substantially parallel to that direction, thereby reducing to a minimum the back pressure.

Concisely stated, the object of my invention is the provision of a rotary power-driven plowing implement which will drive itself forward when rotated in contact with the soil.

On the accompanying drawings, forming a part of this specification, I have illustrated the preferred embodiment of my invention, and on said drawings like reference characters refer to the same parts throughout the views.

Figure 5:
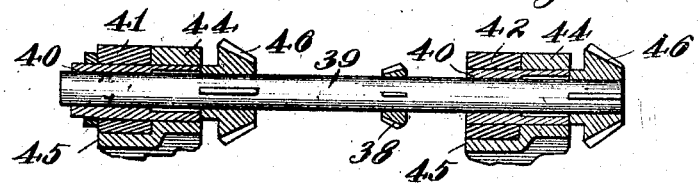

Referring to the drawings Figure 1 is a plan view of my improved disk plow; Fig. 2 is a side elevation of the plow, certain parts being broken away to more clearly illustrate the construction, and the engine being shown in dotted lines; Fig. 3 is a front end elevation of the machine, the engine being shown in dotted lines; Fig. 4 is a vertical cross-section on line 4—4 of Fig. 1; Fig. 5 is a vertical section on line 5—5 of Fig. 1; Fig. 6 is a section on line 6—6 of Fig. 4. Fig. 7 is a plan view on an enlarged scale of one of the plowing disks, the arrow indicating the forward direction of travel of the same, and one of the blades of the disk being shown in full line and dotted line position; and Fig. 8 is a rear elevation of the disk shown in Fig. 7, the ground or earth being also shown.

Suitably supported on a substantially triangular frame 10 provided with a floor or deck 11 is a motor 12 of any desirable form, such as a gasolene engine. The frame 10 is supported on three carrying wheels 13, 14 and 15, all of which are mounted on bent axles 16, 16ª and 17 in suitable boxes or bearings, the latter axle 17 having a downwardly-inclined portion 18 on which the tilted furrow wheel 15 is mounted. The axle 16ª is held from turning in any preferred manner, but the axles 16 and 17 each have fixed thereto and projecting forwardly a crank arm 19, the pair of arms being connected by a cross-bar 20 which may be shifted by a steering handle 21 on the top of an upright shaft 22 journaled on the frame at 23 and connected to the central portion of rod or bar 20 by an arm 24. By this means the two front wheels may be turned so as to steer the machine in any direction desired.

The single rear drive wheel 13, which is used for propelling the machine only when the bladed disks are not operated, is ribbed on its periphery at 14 for an obvious purpose and receives power from the engine 12 through the coöperating gears 25 and 26, the latter of which is fixed to a main power shaft 27 rotatable in bearings 28 and 29 on the frame. By means of a clutch 30 controlled by a handle 31 the sprocket wheel 32 may be clutched and unclutched from the shaft 27. As is clearly illustrated in Fig. 2, the rotation of wheel 32 is transmitted to the carrying drive wheel 13 by a sprocket chain 33 and another sprocket wheel 34. By the means described above the plow may be steered and caused to travel or be propelled when no plowing is being done.

A bevel gear 35 at the inner end of shaft 27 may be operatively connected to and disconnected from the shaft 27 by a clutch 36 actuated by a convenient controlling handle 37. The teeth of gear 35 mesh with those of a similar bevel gear 38 fixed to a diagonal driving shaft 39 rotatable in sleeves 40 within bearings 41 and 42 (see Fig. 5) mounted on the machine frame. Hung and rotatable on the two sleeves 40 I provide a pair of bracket supports or hangers 43 each of which has a top circular portion 44 encircling one of the sleeves and a shelf or forward projection 45 extended below and bearing against the adjacent under surface of bearing 41 or 42. Keyed to shaft 39 adjacent to the supports or hangers 43 are a pair of bevel pinions 46, the teeth of each of which mesh with those of a similar pinion 47 on a tilted shaft 48 rotatable in bearings 49 and 50 of each support or hanger 43. Each support 43 is also equipped with a pair of bearings or boxes 51 and 52 within which rotates an inclined shaft 53 having fixed to its upper end a concave plow disk 54. The rotation of shaft 48 is transmitted to the shaft 53 through a pair of bevel gears 55 and 56 suitably housed within the hollow interior of a divided casing 57 at the bottom end of the support 43. In casing 57 I place an adjusting screw 57$^a$ bearing against the adjacent end of shaft 53.

It will be apparent from the above description and illustration that the supporting brackets or hangers 43 with the disks and gears carried thereby may be swung around the axis of shaft 39 on the bushings 40 to the dotted line positions shown in Fig. 4, and in order to limit the forward turning of these parts when in their lowermost position and to transmit the propelling power of the bladed disks to the machine frame and other parts, each supporting bracket or hanger 43 is supplied with an arm 58 which abuts against the under surface of the frame of the machine.

Each plow disk 54 has on its rear convex face any desired number of outwardly-extended blades or vanes 59 which are preferably cast integral with the disk and each provided with a rounded corner 60 between its longitudinal tapered edge 60$^a$ and its outer end edge 61. These vanes or blades are so positioned on the disk that they enter the ground substantially at right angles to the direction of travel of the machine to gain a firm hold in the ground, and leave the ground substantially parallel to that direction to reduce the back pressure. They are in effect sections or parts of a large screw. Owing to the rounded corner 60 of the blades and the inclined or beveled edges 60$^a$ and 61 of the same, the blades gradually enter the ground with a sort of shearing action whereby they may readily cut through any turf or roots or slide off of any rock or like obstruction. During the plowing operation the clutch 30 by means of its handle 31 is rendered inoperative and the clutch 36 is thrown into action, thereby causing the rotation of shaft 27 driven by the engine to be transmitted through the gears 35 and 38 to the driving or power shaft 39 and from the latter through the gears 46 and 47, shaft 48, and gears 55 and 56 to the bladed or vaned concave plowing disks. The disks 54, in conjunction with the scrapers or mold boards 62 perform the usual function of digging the furrow and turning over the earth, while the outwardly-projected vanes or blades 59 dig into the sub-soil not reached by the disks and obtain a sufficient purchase therein to enable the engine to propel the machine forwardly. In addition the blades or vanes stir up or loosen the sub-soil and thereby perform the added function of assisting in the cultivation of the ground. The edge 60$^a$ of each blade enters the ground at substantially right angles to the direction of travel of the machine, as indicated in Fig. 7, one of the blades being shown in full and dotted line positions. When the blade reaches the sub-soil its end edge 61 also enters the same at practically a right-angle to the direction of travel, but the blade in leaving the ground does so with the edge 61 substantially parallel to the direction of movement of the machine, thereby reducing the back pressure of the blade in the ground to a very small amount (Figs. 7 and 8).

A seat 63 is supplied at the rear of the steering handle 21 and adjacent to the engine 12, so that both may be under the control of the operator, and the steering gear may be locked in any position desired by a handle 64 pivoted on the frame and equipped with a dog adapted to enter any one of a series of notches of a segment 65 movable with the steering shaft 22.

In order to vary the depth of cut, I have made the vertical portions of all three axles 16, 16$^a$ and 17 comparatively long and fix to the top end of each a notched segment 66 to which is fulcrumed at 67 a bell-crank lifting lever 68 having a spring-pressed, manually-actuated dog 69 adapted to enter any one of the notches of the segment. The shorter arm of this lever is connected by a link 70 to the adjacent portion of the frame which is slidable on the axles. By operating all three of these levers the frame may be raised or lowered and locked in adjusted position to obtain the desired depth of cut. If during the plowing operation any one or more of the disks strike an obstruction which they cannot remove, they will be swung rearwardly by the same, the brackets 43 turning on the sleeves 40, permitting the disks to ride over the obstruction, and owing to their weight they will again enter the ground on the other side of the obstruction.

It will be apparent to those skilled in the art that the details of construction of this device may be modified and varied to a considerable extent without departing from the heart and essence of my invention, which is not limited to the precise structural details shown but relates broadly to the propulsion of a plow by means of a vaned or similar member, the blades of which are adapted to enter the ground. As is obvious, it is possible to use a vaned or bladed member of the general character indicated for propelling the machine and loosening up the earth without using a concave plowing disk. The number of disks, blades, carrying wheels and the like is quite immaterial and may be changed as desired without sacrificing the benefits and advantages of my invention or departing from its substance.

I claim:

1. In a plow, the combination of a rotary concave disk adapted to dig the furrow and turn the earth, said disks having propelling outstanding blades positioned thereon so as to enter the ground, and means to rotate said bladed disks to propel the plow and dig the furrow, substantially as described.

2. In a plow, the combination of a rotary concave disk adapted to dig the furrow and turn the earth, said disk having outstanding blades positioned thereon so as to enter the sub-soil and loosen up the same, and means to rotate said disk and blades to propel the plow and dig the furrow, substantially as described.

3. In a plow, the combination of a rotary bladed member, the blades of which are outstanding and positioned on said member so as to enter the ground, said member and blades being disposed at such an angle relative to the travel of the plow, that the blades enter the ground substantially at right angles to such travel, and leave the ground substantially parallel to such travel, and means to rotate said member to propel the plow, substantially as described.

4. In a plow, the combination of a rotary bladed member, the blades of which are outstanding and positioned on said member so as to enter the sub-soil, said member and blades being disposed at such an angle relative to the travel of the plow, that said blades enter the sub-soil substantially at right angles to the travel of the plow, loosen up the sub-soil, and leave the ground substantially parallel to such travel, and means to rotate said member to propel the machine, substantially as described.

5. In a plow, the combination of a rotary concave disk, adapted to dig the furrow, said disk having outstanding blades, said disk and blades being disposed at such an angle relative to the travel of the plow, that the blades enter the sub-soil substantially at right angles to the direction of travel of the plow, loosen up said sub-soil, and leave the ground substantially parallel to such travel, and means to rotate said bladed disk to propel the machine, substantially as described.

6. In a plow, the combination of a supporting frame, a plurality of brackets or hangers rotatably mounted on said frame, and capable of swinging rearwardly independently of one another, a concave disk carried by each of said brackets or hangers and adapted to dig the furrow, each of said disks having outstanding blades adapted to enter the ground, whereby the mountings of said disks permit them to ride over obstructions, and means to rotate said bladed disks and propel the machine, substantially as described.

7. In a plow, the combination of a frame, a bracket or hanger rotatably mounted on said frame, and capable of swinging rearwardly, and a concave disk rotatable on said bracket or hanger, and adapted to dig the furrow, outstanding blades on said disk, positioned thereon so as to enter the sub-soil and loosen up the same, whereby the mounting of said disk permits it to ride over obstructions, and means to rotate said bladed disk, substantially as described.

GEORGE G. FLOYD.

Witnesses:
E. B. SHERZER,
JAS. H. LOUIE.